L. W. JONES & F. B. LEOPOLD.
WATER SOFTENER.
APPLICATION FILED DEC. 3, 1906.

900,551.

Patented Oct. 6, 1908.

4 SHEETS—SHEET 3.

WITNESSES.

INVENTORS.

L. W. JONES & F. B. LEOPOLD.
WATER SOFTENER.
APPLICATION FILED DEC. 3, 1906.

900,551.

Patented Oct. 6, 1908.

4 SHEETS—SHEET 4.

WITNESSES.

INVENTORS.

UNITED STATES PATENT OFFICE.

LLEWELLYN W. JONES AND FREDERICK B. LEOPOLD, OF SEWICKLEY, PENNSYLVANIA, ASSIGNORS TO PITTSBURGH FILTER MANUFACTURING COMPANY, OF PITTSBURG, PENNSYLVANIA, A CORPORATION OF PENNSYLVANIA.

WATER-SOFTENER.

No. 900,551.  Specification of Letters Patent.  Patented Oct. 6, 1908.

Application filed December 3, 1906. Serial No. 346,018.

*To all whom it may concern:*

Be it known that we, LLEWELLYN W. JONES and FREDERICK B. LEOPOLD, residents of Sewickley, in the county of Allegheny and State of Pennsylvania, have invented a new and useful Improvement in Water-Softeners; and we do hereby declare the following to be a full, clear, and exact description thereof.

Our invention relates to water softening apparatus, its object being to provide a water softener of the continuous type, in which provision is made for the proper saturation of the water with the lime, together with the mixing of the water to be treated and the re-agent in such manner as to provide for the removal of the carbonate of lime from the water in an efficient and reliable manner.

Our invention comprises the novel features hereinafter set forth and claimed.

Figure 1:
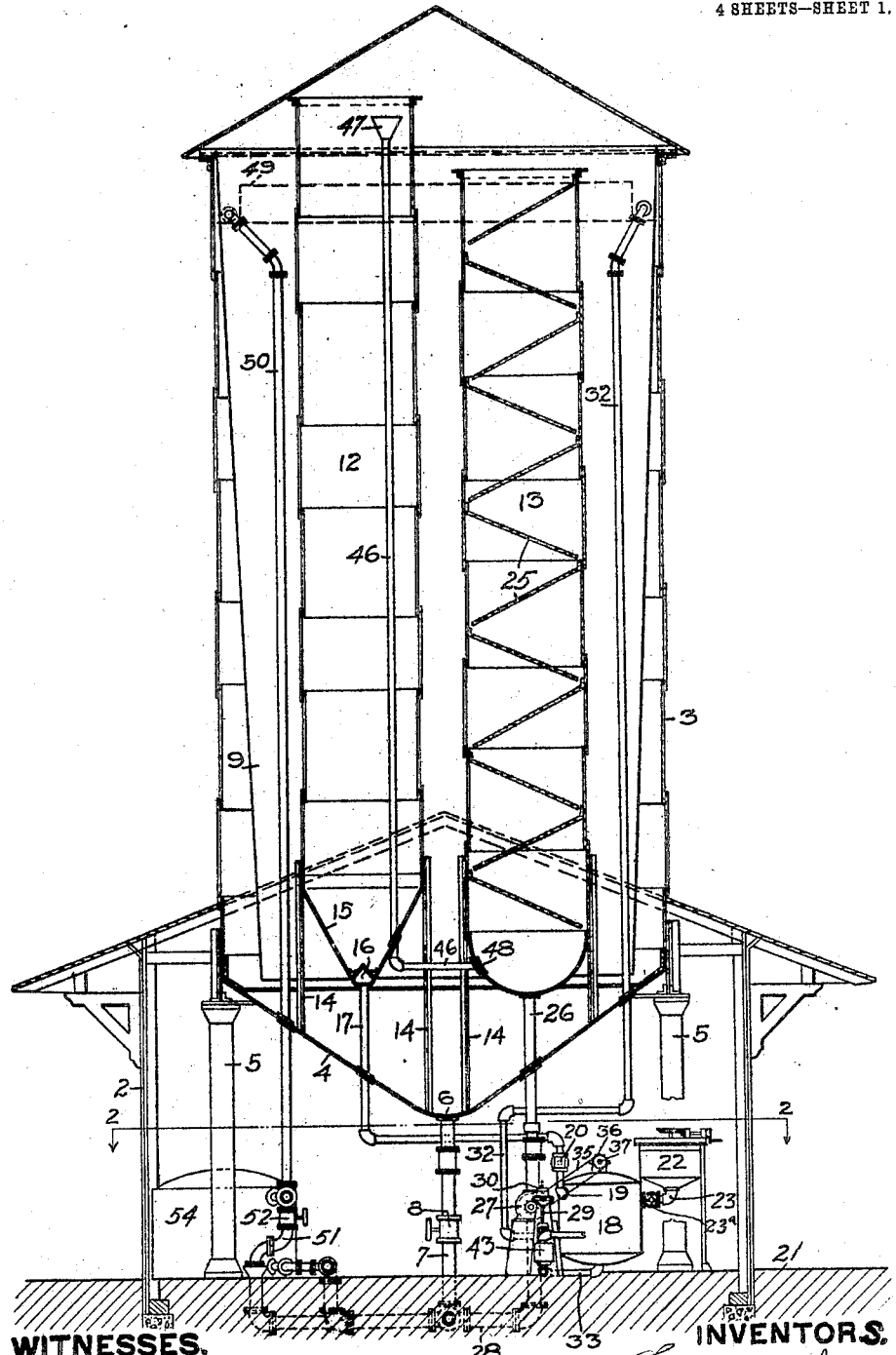
Figure 2:
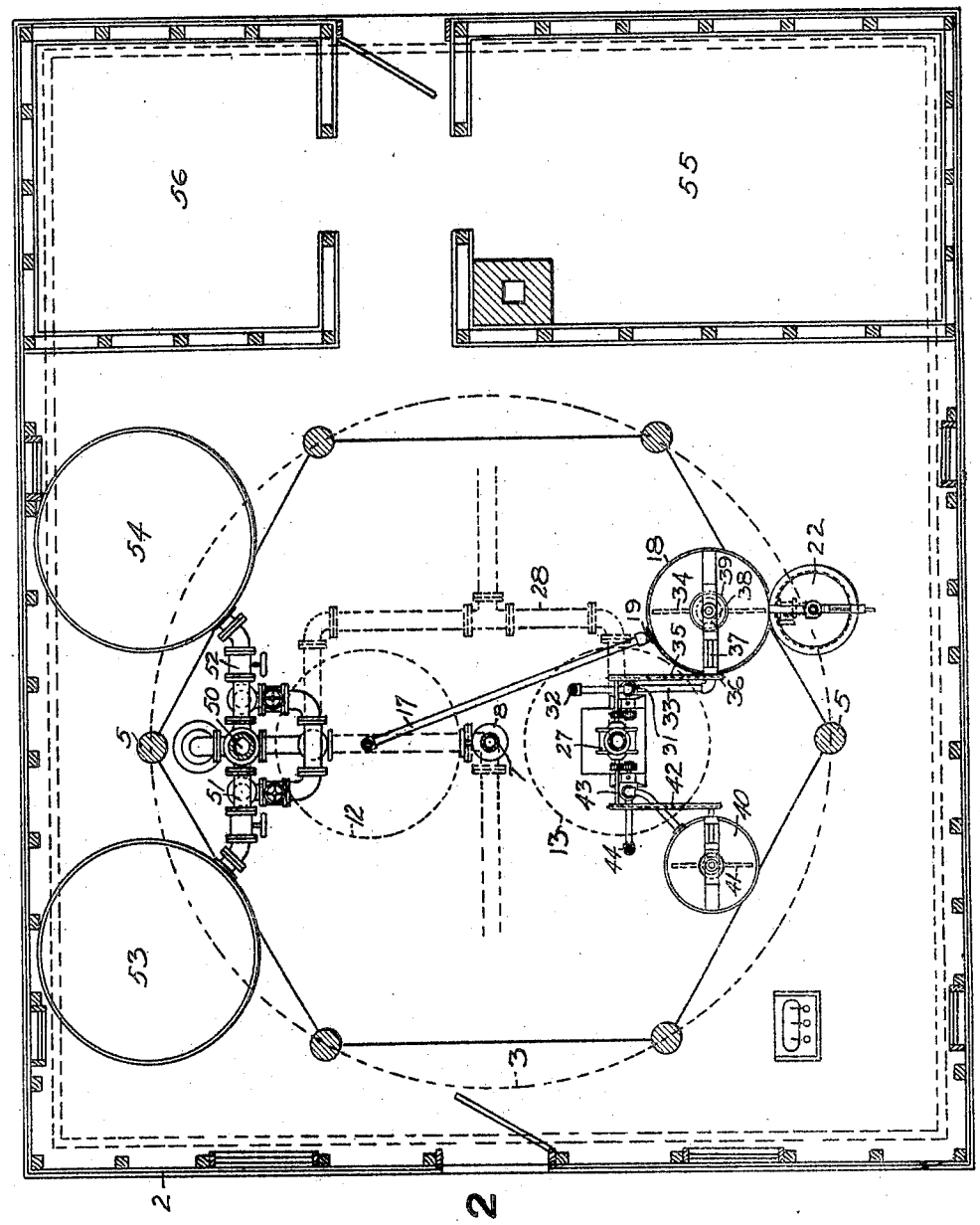
Figure 3:
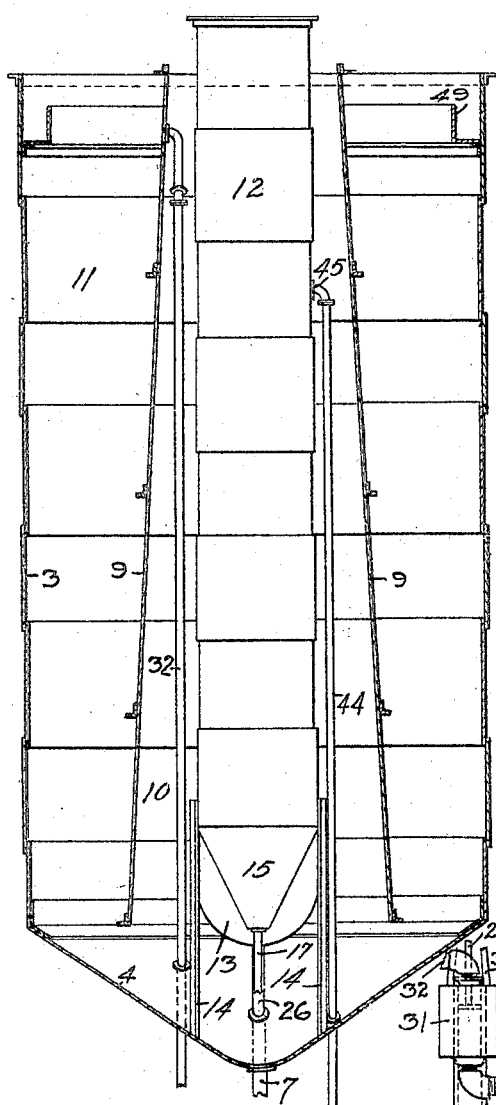
Figure 4:
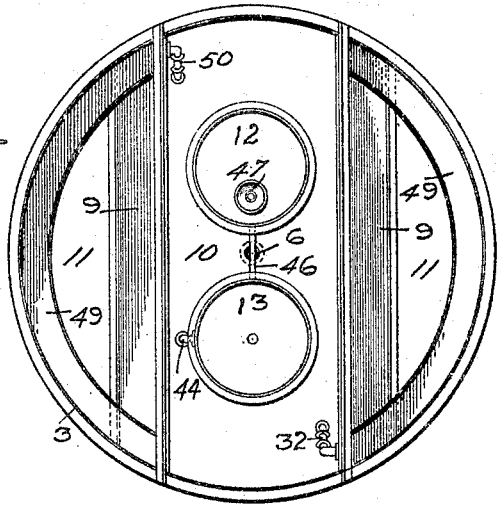
Figure 5:
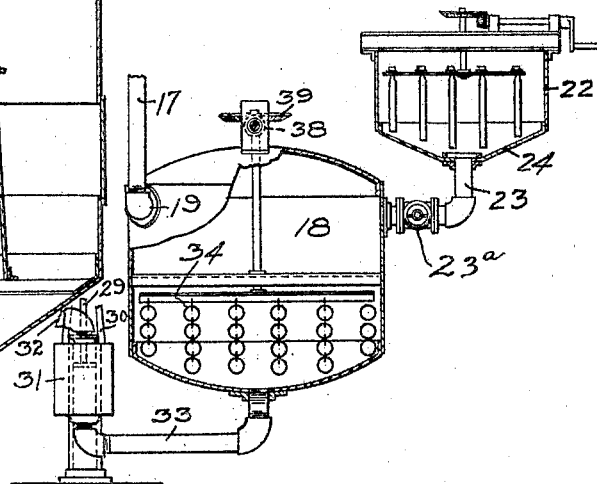
Figure 6:
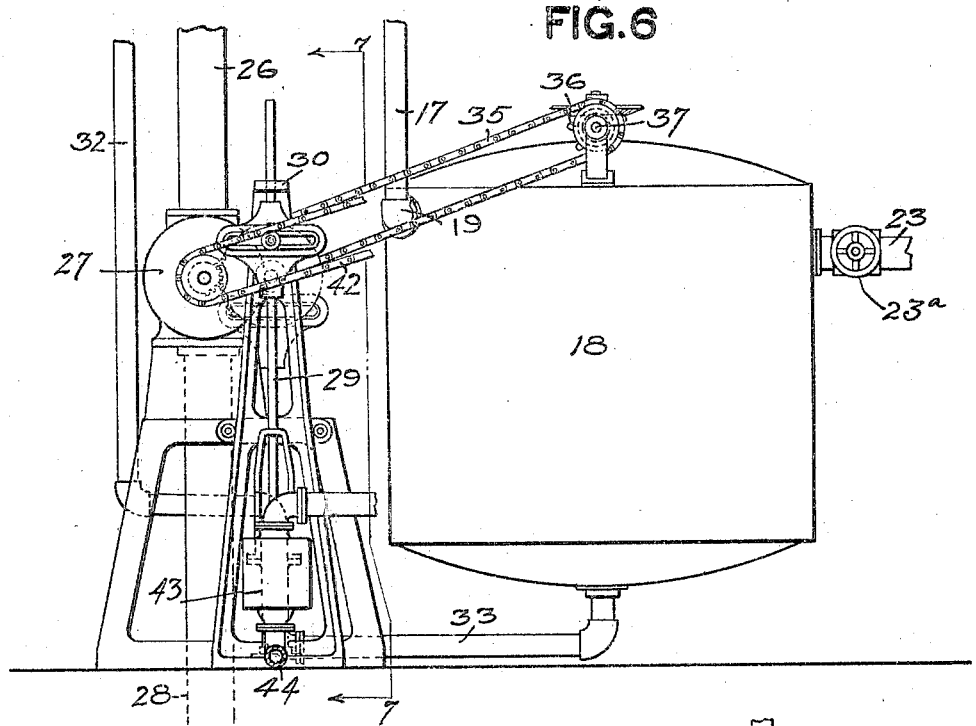
Figure 7:
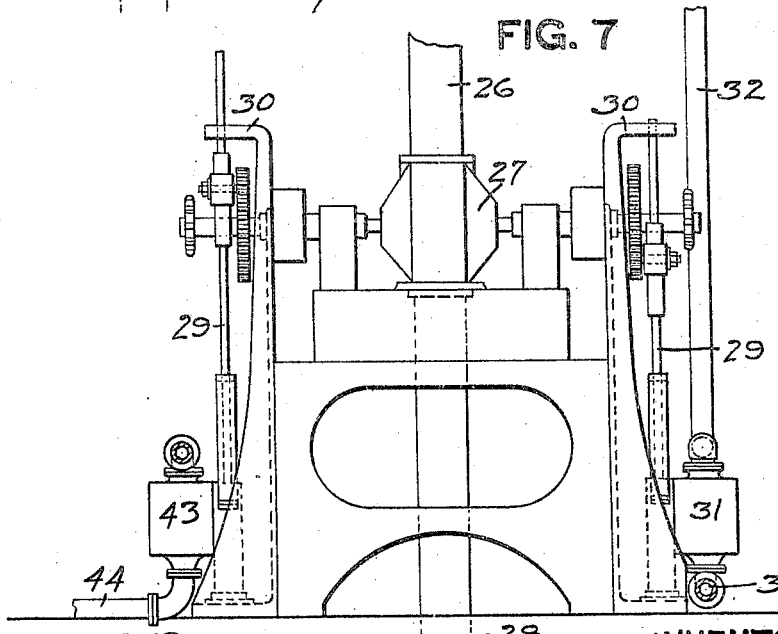

In the drawings Figure 1 is an elevation of our improved water softening apparatus showing the tank in section; Fig. 2 is a plan view of the apparatus below the tank, the tank being indicated in dotted lines; Fig. 3 is a vertical elevation showing the tank in section and at a different angle from that shown in Fig. 1; and Fig. 4 is a plan view of the tank, Fig. 1; Fig. 5 is a sectional detail of the lime tank and slaking box; Fig. 6 is an enlarged side view of the lime tank showing the pump and its connections to said tank; and Fig. 7 is a front view of the frame showing the motor and the pumps.

In the drawings the numeral 2 designates a suitable house for inclosing the working parts of the apparatus. The tank 3 is supported by the pillars 5, said tank extending without and above said house to any suitable height. The lower end of the tank 3 is made with the vertical conical base 4, with an opening 6 to which the pipe 7 is connected up for drawing off the sediment or deposit which collects in the bottom of said tank. Accordingly, said pipe 7 is provided with the valve 8. Within the tank 3 are the baffles 9 which divide the tank 3 into three compartments 10 and 11. Within the compartment 10 are the solution chamber or saturater 12 and the reaction tank or receptacle 13, said solution chamber and tank being supported by the uprights 14. The solution chamber 12 extends up within the tank 3 to a greater height than the reaction chamber 13 and said solution chamber is provided with the inverted conical bottom 15 provided with the opening 16 to which the pipe 17 is connected. This pipe 17 leads to the lime tank 18 to which it is connected as at 19. This pipe 17 may be provided with a suitable valve 20.

The lime tank 18 is located upon the floor or foundation 21 within the house 2 and said tank is connected up to the slaking box 22 by means of the pipe 23. A valve 23$^a$ controls the communication between the slaking box 22 and the lime tank 18. The slaking box 22 is provided with the inclined bottom 24 and contains the lime which is to be slaked and which then passes by the pipe 23 into the lime tank 18. The lime tank 18 is closed and is therefore under pressure.

The reaction tank 13 is provided with the internal baffles 25 and at its lower end is connected up by the pipe 26 to the outlet or exhaust of the motor 27. This motor 27 may be of any suitable construction, that known as the "Gould" motor being particularly adapted for this purpose. A pipe 28 leading from the raw water supply is connected up with the motor 27 and by means of which the said motor is operated. In this manner the water is admitted under pressure and the exhaust thereof is carried up under pressure into the reaction chamber to the upper end of the tank 3 without other aid. The motor 27 has the pitman 29 adjustably secured within guides 30, the opposite end of said pitman being connected up to the pump 31, said pump being connected up to the pipe 32 at its inlet and its exhaust being connected up to the pipe 33 leading to the bottom of the lime tank 18. In this manner the treated water only passes through the pump 31 and is forced thereby through the tank 18 so as to drive the lime water therein through the pipe 17 into the saturater 12. By this construction the lime water does not pass through the pump and as a consequence the pump valves do not become clogged up with the lime which becomes caked therein so as to prevent its proper operation and entail the necessity of cleaning out the pump frequently to keep it in proper shape for pumping. It is apparent that by varying the stroke of the pump 31 the amount of water introduced to the lime tank 18 may be varied to suit the different conditions.

Within the lime tank 18 is a suitable mixer 34 for stirring up the contents of said tank, and this mixer is driven by the belt 35 connected up to the shaft of the motor 27. The belt 35 drives the sprocket 36 on the shaft 37 which carries the bevel pinion 38 meshing with the bevel pinion 39 upon the shaft carrying the stirrer 34.

Located opposite the lime tank 18 is the soda tank 40 which has a suitable stirrer 41 therein driven by the belt 42 in the same manner as the stirrer in the lime tank 18. A suitable pump 43 is also provided driven by the motor 27 in the same manner as the pump 31, said pump 43 being adapted to deliver the soda solution through the pipe 44 into the reaction chamber 13 as at 45.

Within the chamber 12 is the pipe 46 which is provided at its upper end with the funnel 47. The pipe 46 passes through the bottom 15 of the chamber 12 and enters the reaction chamber 13 at 48. By admitting the lime water to the reaction chamber at this point the water rises within the reaction chamber, meeting the flow of the hard water to be treated entering the pipe 26 and is carried up through said reaction chamber without the liability of the hard water, which enters under pressure, forcing the lime water back through the pipe 46 into the chamber 12.

At the upper end of the tank 3 is the overflow trough 49 which collects the treated water and the pipe 32 connects with this overflow trough so that the treated water is fed through the pump 31 and thence into the lime tank 18. A pipe 50 leads from the overflow trough to carry the treated water down to the pipes 51 which are controlled by valves 52 and which carry the treated water to the filters 53 and 54. Within the house 22 are the bins 55 and 56 for the storage of lime and soda, respectively.

When our improved apparatus is in operation the hard water to be treated is conducted from the supply and introduced by means of the pipe 28 to the motor 27 and by its pressure acts to drive said motor, and consequently the pumps 31 and 43. The water in passing through the exhaust of the motor 27 is carried by the pipe 26 up into the reaction chamber 13. Meanwhile, the pump 31 supplied with the treated water from the pipe 32 delivers this water to the lime tank 18 and the water is forced up through said tank and out through the pipe 17 into the solution chamber 12. This is due to the fact that the lime tank 18 is closed and under pressure. The lime is supplied by means of the pipe 23 from the slaking box 22 to the lime tank 18 in suitable quantities; while the stirrer 34 keeps the solution in the tank 18 properly mixed. When it is desired to admit the lime from the slaking box 22 to the lime tank 18, the pump is stopped and the valve 20 in the pipe 17 is closed. By this arrangement the back flow into the slaking chamber 22 is avoided. When the proper supply has been admitted from the slaking box the valve 23ᵃ is closed and the valve 20 opened, whereupon the water is forced up through the lime tank and carries the lime through the pipe 17. As the lime water passes through the pipe 17 up into the saturater 12 it ascends said saturater and overflows into the nozzle 47 whence it descends by the pipe 46 to the bottom of the reaction chamber 13. Here the lime meets the hard water and both are carried up through the baffles 25, becoming thoroughly mingled as they rise. The lime water and hard water intermingled in this manner overflow from the upper end of the reaction chamber 13 into the compartment 10 and flow down said compartment. In their downward flow, the carbonate of lime is deposited in the bottom of the tank 3 and the water ascends in the compartment 11 gradually until it overflows into the trough 49 at the upper end of the tank 3. The treated water is then carried down by the pipe 50 to the filters 53 and 54, while a portion thereof is drawn off by the pipe 32 to supply the pump 31 with the water for the lime tank 18. We omitted to mention that the soda solution is pumped from the tank 40 and introduced by means of the pipe 44 to the reaction chamber at a proper point so as to become intermingled with the lime and hard water in the reaction chamber before the same flows into the depositing compartment 10.

By locating the lime tank at the bottom of the main tank and having the slaking tank at a low level, the lime may be introduced into the slaking tank without difficulty, as the said tank is at a sufficiently low level to permit of the introduction of the lime by a person standing on the floor level.

What we claim is:

1. In water softening apparatus, the combination of a tank having up-take and down-take compartments therein of substantially the same height as said tank, a solution chamber in said down-take compartment, a re-action chamber in said down-take compartment communicating at its upper end with said down-take compartment, an overflow pipe in said solution chamber communicating with the lower end of said re-action chamber, and means for introducing the water to be treated to the lower end of said re-action chamber.

2. In water softening apparatus, the combination of a tank having up-take and down-take compartments therein of substantially the same height as said tank, a solution chamber in said down-take compartment, a re-action chamber in said down-take compartment communicating at its upper end with said down-take compartment, said solution chamber extending to a greater height than said re-action chamber, an over-flow pipe in said solution chamber communicating with the lower end of said re-action chamber, and means for introducing the water to be treated to the lower end of said re-action chamber.

3. In water softening apparatus, the combination of a tank, baffle plates extending across said tank and dividing the same into three compartments, comprising a down-take and up-takes of substantially the same height as the said tank, a solution chamber in said down-take compartment, a re-action chamber in said down-take compartment communicating at its upper end with said down-take compartment, an over-flow pipe in said solution chamber communicating with the lower end of said re-action chamber, and means for introducing the water to be treated to the lower end of said re-action chamber.

4. In water softening apparatus, the combination of a main tank, a closed lime tank at the lower end of said main tank, a lime slaking receptacle at a low level, pipe connections between said slaking receptacle and said lime tank, a valve controlling said connections, a pump, means for connecting said pump to a water supply, and means for forcing the water directly from said pump into said lime tank, a solution chamber, pipe connections between said solution chamber and said lime tank, and a valve in said connections.

In testimony whereof, we the said LLEWELLYN W. JONES and FREDERICK B. LEOPOLD have hereunto set our hands.

LLEWELLYN W. JONES.
   FREDERICK B. LEOPOLD.

Witnesses:
 ROBERT C. TOTTEN,
 ROBT. D. TOTTEN.